United States Patent
Tirey et al.

(10) Patent No.: US 9,363,383 B1
(45) Date of Patent: Jun. 7, 2016

(54) PHONE-CALL TRIGGERED SYSTEM AND METHOD FOR TRANSMITTING INFORMATION VIA NETWORK-ENABLED SERVER

(71) Applicant: IFBYPHONE, INC., Chicago, IL (US)

(72) Inventors: Jeffrey S. Tirey, Strongsville, OH (US); Bradley Reynolds, Olmsted Falls, OH (US)

(73) Assignee: DIALOGTECH INC., Chicago, IL (US)

( * ) Notice: Subject to any disclaimer, the term of this patent is extended or adjusted under 35 U.S.C. 154(b) by 0 days.

(21) Appl. No.: 14/335,535

(22) Filed: Jul. 18, 2014

Related U.S. Application Data (63) Continuation of application No. 12/384,314, filed on Apr. 2, 2009, now Pat. No. 8,817,957.

(60) Provisional application No. 61/042,242, filed on Apr. 3, 2008.

(51) Int. Cl.
  *H04M 11/06* (2006.01)
  *H04M 7/00* (2006.01)

(52) U.S. Cl.
  CPC .................................. *H04M 7/0024* (2013.01)

(58) Field of Classification Search
  CPC ..................................................... H04M 11/06
  USPC ...................... 379/93.01, 93.07, 93.08, 93.09
  See application file for complete search history.

(56) References Cited

U.S. PATENT DOCUMENTS

| | | |
|---|---|---|
| 6,470,079 B1 | 10/2002 | Benson |
| 6,611,590 B1 | 8/2003 | Lu et al. |
| 7,120,235 B2 | 10/2006 | Altberg et al. |
| 2001/0005415 A1* | 6/2001 | Grunsted et al. .............. 379/350 |
| 2004/0039775 A1 | 2/2004 | Yoshida et al. |
| 2004/0145652 A1 | 7/2004 | Yamauchi et al. |
| 2005/0125302 A1 | 6/2005 | Brown et al. |
| 2005/0207560 A1* | 9/2005 | Speight .................... 379/266.07 |
| 2005/0220289 A1* | 10/2005 | Reding et al. ............ 379/265.09 |
| 2006/0018311 A1 | 1/2006 | Kobayashi et al. |
| 2006/0209809 A1 | 9/2006 | Ellingham et al. |
| 2008/0043954 A1 | 2/2008 | Newsom et al. |
| 2008/0260128 A1* | 10/2008 | Conway et al. .......... 379/201.02 |
| 2009/0097631 A1* | 4/2009 | Gisby ..................... H04M 3/46 379/211.02 |
| 2009/0164621 A1 | 6/2009 | Kothari et al. |
| 2009/0232288 A1 | 9/2009 | Forbes et al. |

* cited by examiner

*Primary Examiner* — Christopher M Brandt
(74) *Attorney, Agent, or Firm* — Barnes & Thornburg LLP (57) ABSTRACT

In one embodiment, a phone number is used in connection with an advertising or marketing campaign. The account associated with the phone number may be configured to specify the type of information and the type of actions to be taken when a phone call is placed to the phone number. After the call that has placed to the phone number has completed, information relating to the call is compiled. Upon compilation, the information is transmitted by a network-enabled device using a protocol, where in one embodiment, the protocol is HTTP.

22 Claims, 9 Drawing Sheets

PHONE-CALL TRIGGERED SYSTEM AND METHOD FOR TRANSMITTING INFORMATION VIA NETWORK-ENABLED SERVER

CROSS REFERENCE TO RELATED APPLICATIONS

This application is a continuation of U.S. patent application Ser. No. 12/384,314, filed Apr. 2, 2009, which claims the benefit of U.S. Provisional Application No. 61/042,242, filed on Apr. 3, 2008, both of which are hereby incorporated by reference herein in their entireties.

BACKGROUND

Visitorship to a website and interactions within the website are often monitored so that a website owner may assess the actions of a visitor in the context of the website visit. However, once a website visitor leaves the website or takes actions that cannot tracked through the visitor's interaction with the website, the website owner is unable to evaluate the actions of the potential client as it relates to the website owner's business. One type of visitor action that may be useful to monitor includes the visitor's action of placing a phone call to the business described on the website.

In one embodiment, as will be described herein, a procured phone number is routed to a destination number. The call is then connected. Once the call has completed, information is transmitted to a call processing module. The call processing module compiles call information, including any information that has been specifically designated in the customer account and associated with the procured phone number. If the account that has been associated with the procured phone number has specified a URL, then the URL is placed into a queue. The queue is accessed and a network-enabled device (such as an internet enabled device) retrieves the URL and transmits to the URL through any conventional method. Such methods may include, but are not limited to XML, http/web transmission, FTP, etc. If a web transmission method has been specified, a web browser is opened and the specified URL is loaded. This then results in a transmission of pre-designated user-requested information.

BRIEF DESCRIPTION OF THE DRAWINGS

There are shown in the drawings one embodiment of the system and methods described herein, it being understood, however, that this invention is not limited to the precise arrangements and instrumentalities shown.

DETAILED DESCRIPTION OF ILLUSTRATED EMBODIMENTS

As will be described below, the system and method described herein may be used by a Customer, such as an individual or entity, to monitor, track, and/or determine the behavior of a telephone Caller 10 in response to advertising and marketing presence and campaign. Advertising and marketing campaigns may include, but are not limited to websites, and other internet marketing/advertising, billboards, periodical and newspaper advertisements, other print media, television, or radio, as well as any other type advertising or marketing media. A phone number may have been included in these advertising media. In an alternative embodiment, the phone number may not necessarily be utilized for advertising, but rather, as a mechanism to monitor the type, mode and quality of a respondent Caller 10. For example, in one useful embodiment, a trackable phone number can be used to determine (or track) a Caller's 10 off-line action in placing a call to a phone number that the Caller 10 located through on-line or electronic media. Although the Customer can monitor the visitorship to the Customer's website, once a potential client (e.g., Caller) of the Customer leaves the website or takes actions that cannot conventionally tracked on-line, the Customer is unable to evaluate the actions of the potential client as it relates to the Customer's business. For example, if a Caller 10 decides to place a call to a phone number located on the Customer's website, the Customer typically has no ability to track the fact that the Caller 10 has placed the call as a result of the phone number located on the Customer's website.

The system and method described herein provides for the placement of URL visit in response to a phone call that is placed to a chosen phone number by a Caller 10. For example, in one useful embodiment of the system and method, once a call is placed to a chosen phone number, a URL visit to an internet webpage is prompted in response to the phone call and/or termination of the phone call. In this manner, a website administrator or the Customer can track phone calls that have been placed in response to its marketing efforts alongside actual webpage visitorship. Further, the webpage owner may choose to integrate the system and method with analytics methods that he/she may already be utilizing in order to evaluate its website traffic.

In accordance with one embodiment of the system and method described herein, once a Caller 10 has accessed the phone number that has been circulated by the Customer, the Caller 10 may place a call to the phone number, which call can then be tracked by the Customer. The Caller 10 begins by dialing the digits of the phone number. The Caller 10 places the call though any calling methods, including, but not limited to, traditional rotary or touch-tone phone set or an internet-based or VOIP phone service.

In one embodiment of the system and method, a Customer may use, or provision for use, a trackable phone number in order to obtain information relating to the Customer's targeted clients and the effectiveness of the Customer's campaigns toward its targeted clients. The phone number provisioning process begins by the creation of a Customer account. The Customer account may be created through any on-line mechanism, such as through the use of the internet via a web browser. However, it is to be appreciated that the Customer account, and subsequent procurement of a phone number, may be created by the Customer by contacting the provider by phone, fax or other means. If the Customer uses an on-line mechanism to create a Customer account, the Customer accesses the provider's webpage and proceeds to input any quantity of desired information that the provider seeks for the account set-up, including Customer contact and billing information. In one embodiment, the Customer may place at least one credit card number on file in order to be charged for phone numbers it wishes to provision. Once a Customer has provided the appropriate information, the Customer proceeds to the next phase in the provisioning process. In this phase, the Customer may fund its account, such as by authorizing payment through a credit card that is listed in the Customer account. Once the Customer's account has been initiated, the Customer may begin the phone number provisioning process. It is to be appreciated that the phases and steps recited above may be taken in any order. For example, it is not necessary that the Customer account be funded prior to provisioning a telephone number, or that a credit card number is placed on file. Payment for the provisioned telephone number(s) can be made by any method, either before or after the provisioning process or the duration of the ad campaign has completed. These steps, as well as other steps, can be completed at any time during the phone number provisioning process, as will be apparent to one skilled in the art.

In one embodiment, one or more phone numbers may be procured through the use of a Provisioning User Interface (PUI) and a Provisioning Module (PM). The PUI and PM may be part of the same program or may be separate programs which interact with each other. The PUI is the interface, such as a web interface that has been established by a provider, through which a Customer may interact and engage in order to procure a phone number. The PM is the back-end of the program, which executes the commands provided by the Customer and executes such commands.

A Customer may begin the phone number provisioning process by navigating through the PUI to display an inventory of at least one phone number that is available for use. In one embodiment, the PUI allows a Customer to view real-time phone number inventory attributable to one or more Telecommunication Carriers 12. In an alternative embodiment, the PUI may list real-time phone number inventory of the provider. In yet another embodiment, the PUI provides the Customer with a combination of inventory from Telecommunication Carrier 12 and the provider. The Customer may view and provision phone number(s) through a series of information requests. As an example, a Customer may use the PUI in the following manner:

(1) the Customer selects a state, which prompts the PUI to retrieve a list of available area codes
(2) the Customer selects one or more area code(s), which prompts the PUI to retrieve available NXXs. NXX numbers are commonly referred to as the central office code or exchange. NXX numbers are a three-digit code (digits 4 through 6) that forms the second part of a 10-digit phone number. Typically, the 10-digits correspond to a North American Numbering Plan Authority (NANPA) phone number offered by provider or a telecommunications carrier 12. Such phone numbers include U.S. and Canadian phone numbers, which further include toll-free or 800 number service. In an alternative embodiment, phone numbers from other communications authorities, as well as from other countries, may be offered for Customer selection.
(3) the Customer selects one or more NXX, which prompts the PUI to retrieve a list of available one or more phone numbers.

Once the PUI displays the available phone number(s), the Customer may then select one or more phone numbers to be provisioned to the Customer's account for use in connection or combination with the system and method described herein. The phone number(s) that are selected by the Customer are "unique" in the sense that such phone number(s) are assigned to one Customer during a given time period, similarly to the way in which residential phone numbers and business phone numbers are typically assigned to one home or business. It is to be appreciated that, although only one Customer will have assigned to it a specific phone number or numbers during the time period for which that Customer maintains the phone number, once the Customer no longer wishes to maintain that phone number, the phone number may be released for use by other customers.

At this point, the Customer may be prompted to confirm whether or not it agrees to the charges are which will be debited from Customer account upon successful provisioning of the phone number(s). In an alternative embodiment, a prompt may not be provided and it may not be necessary that the Customer agree to charges prior to provisioning of the phone number(s).

Once the Customer has provided the requisite information through the PUI, the PUI communicates with the PM, which then places an electronic order for the Customer's selected phone number(s). In such cases where a selected phone number is offered through a telecommunications carrier 12, the PM then communicates information which may be required by the telecommunications carrier 12, such as the phone number or numbers to be provisioned and the route. With the communicated information, the telecommunications carrier 12 attempts to complete the order by billing the provider's master account and updating the provisioned phone numbers' routes. The PM receives from the telecommunications carrier 12 an electronic response, which may either confirm the successful purchase and routing of Customer's selected phone number(s), or provide error information in the even that the provisioning process is unsuccessful. Once the routing process is complete, the provisioned phone number is a "trackable phone number."

As previously noted, it may not be necessary to enlist a telecommunications carrier 12 in order to provide a list of available phone numbers, as the provider may itself have phone numbers available. In this case, the PM communicates directly with the provider in order to enable the purchase and routing of the Customer's selected phone number(s) to produce a trackable phone number.

If, through the PM, an electronic response is received indicating successful purchase and routing of the Customer's selected phone number(s), then the PM completes the debiting of charges to Customer account and thus signifies the successful provisioning of the phone number(s). In one embodiment, the PM may, prior to the debiting of charges, proceed to a series of electronic phone tests on the trackable phone number(s) for quality assurance.

Upon successful provisioning of a phone number, a Customer may utilize the Mapping and Management Module to "map" the trackable phone number to a Destination Number 20. The term "map" and "mapping" are used to describe the process of associating the trackable phone number with a Destination Number 20. The term "Destination Number" is defined as a phone number to which the trackable phone number is designated to be connected upon dialing of the trackable phone number. As an example, when the trackable phone number is dialed, the Destination Number 20 rings. The Mapping & Management Module enables the Customer to complete the mapping process using an interface, such as an web interface, which allows Customer to view trackable phone number(s) in the Customer account and record and save Destination Number(s) 20.

In addition to creating a trackable phone number, the Customer may also conduct additional management options on the trackable phone number. In one embodiment, the Mapping and Management Module, in addition to mapping features, includes functionality to enable analytics integration, audio whisper file, incoming Caller 10 billing address lookup, and a function to enable or disable connection to mapped phone number. The analytics integration set-up is generally performed though the Analytics Module 28, which is further described below. In yet another embodiment, the Mapping & Management Module also allows the Customer to designate one or more URLs, which may be referenced or accessed by the Call Processing Module and Analytics Module 28.

The provider telecommunications infrastructure may include single or multiple telephone switches 14, a database 18 for storing Customer and routing information, and multiple phone network vendors for ingress and egress telephone calling. In one embodiment, the provider call has two processing steps. In the first step, the Caller 10 (calling party) dials the trackable phone number. This call is then routed to the switch 14. The provider Call Processing Module (CPM) 16 identifies the Destination Number 20. In the second step, the provider CPM 16 spawns a new call to the Destination Number 20, and then bridges 22 the two call legs together. The provider Call Processing Module may also include numerous features, including but not limited to caller detail, call recording, and audio indicators, which are further explained below.

Figure 1:
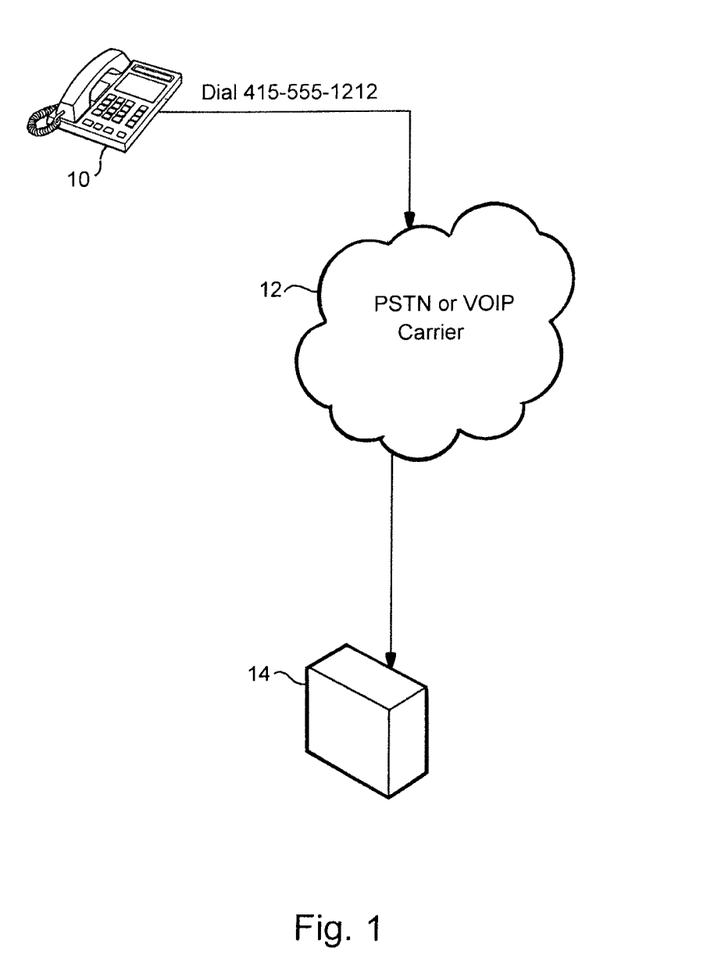
FIG. 1 illustrates one embodiment of call processing.

As shown in FIG. 1, in the "first processing step," once the Caller 10 dials the digits into his phone, the phone transmits the digits to a telecommunications carrier 12 through the specified protocol. In the traditional switched telephone infrastructure, this data is transmitted via DTMF signal. In the mobile or cellular network, the DTMF or digit data is encoded in binary packets and transmitted to the switch 14. In VOIP networks, the digits are packetized and transmitted to the switch 14. In one embodiment, this phone call will be routed to the ingress trunk of whichever telecommunications carrier 12 owns the trackable phone number. Once the telecommunications carrier 12 receives the phone call, it will route the call to provider either via converting to VOIP or via the traditional PSTN trunk method. If the call is converted to VOIP at this stage, the signaling will change to SIP and the media will be transmitted in RTP packets over the IP network. Upon the telecommunications carrier 12 routing the call to provider, the call has reached the switch 14 infrastructure.

The call, at this point in the process, has not been answered, meaning that the ultimate destination of the phone call (Destination Number 20) has not yet picked up the receiver. For example, if a call is forwarded three times from A to B to C to D, the call is not answered until D picks up the receiver. The call sits in stasis, i.e., a holding pattern, meaning that the call will sit in an unanswered state until the final destination picks up the receiver. If, for any reason, the call encounters an error or is terminated before the second processing step has occurred, the call is not routed to the Destination Number 20, and thus, the call will not generate an answer.

Figure 2:
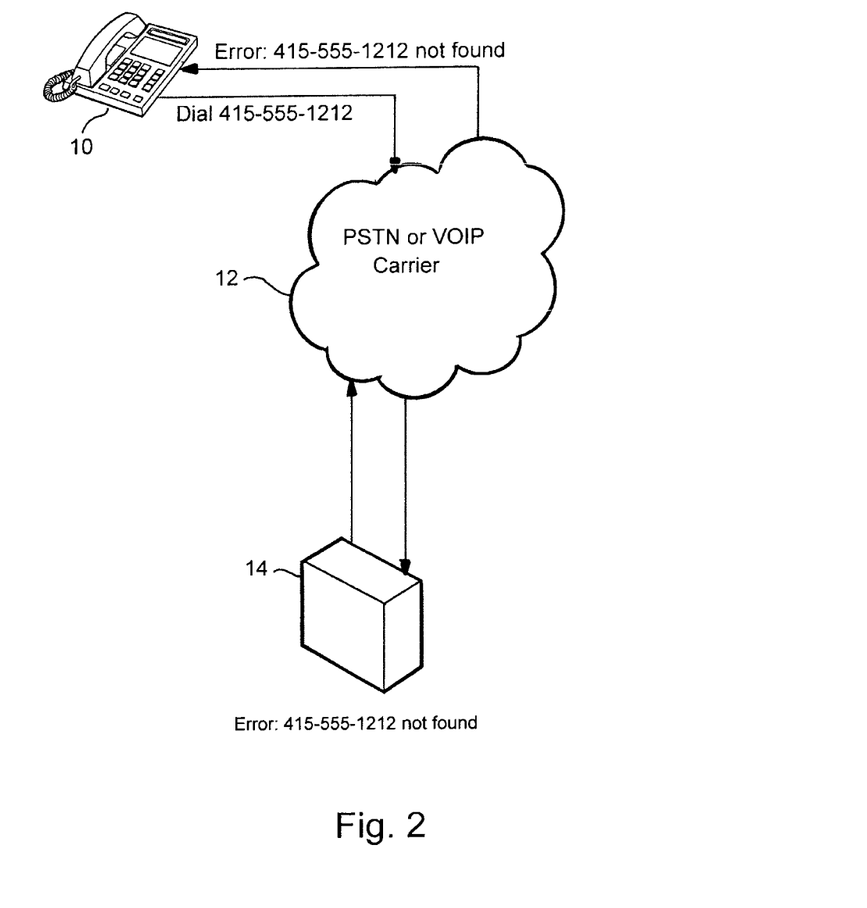
FIG. 2 illustrates another embodiment of call processing.

In one embodiment, once the call has reached the switch 14 infrastructure, the provider may communicate to the telecommunications carrier 12 some basic call processing information which may also indicate any error status. For example, and as shown in FIG. 2, if provider does not find the phone number that has been routed to it in its database 18 (e.g., the phone number is not a provisioned phone number), it will communicate an error back to the telecommunications carrier 12. In one embodiment, this may result in the generation of a special information tone (SIT) like a fast-busy or a message like "this call cannot be completed as dialed" that is communicated to the Caller 10.

Figure 3:
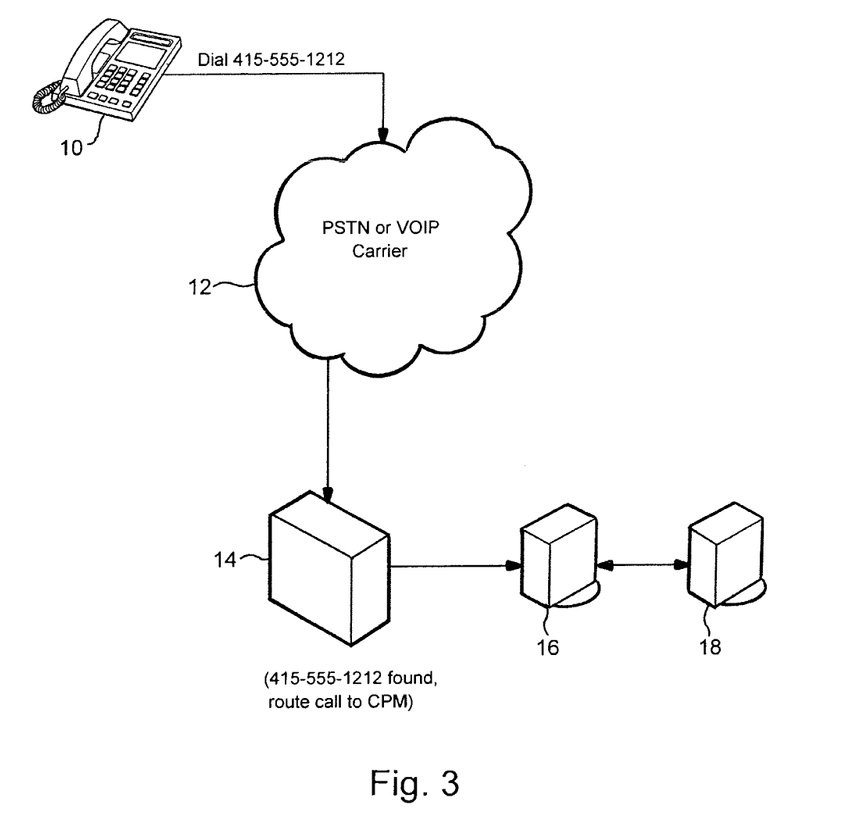
FIG. 3 illustrates yet another embodiment of call processing.

If no errors are determined, the switch 14 starts to invoke its Call Processing Module (CPM) 16, as depicted in FIG. 3. In one embodiment, such as when the switch 14 does not have the requisite functionality, the CPM 16 is a program external to the switch 14 that communicates with the switch 14. In an alternative embodiment, the switch 14 itself may be modified to perform the functions of the CPM 16, and as such, the CPM 16 is part of the switch 14. The CPM 16 determines the routing destination (i.e., the Destination Number 20) of the trackable phone number and communicates this back to the switch 14.

In one useful embodiment, the CPM 16 is invoked as a parallel process to that of the phone switch 14 (i.e., the CPM 16 and the phone switch 14 perform their requisite functions at the same time). However, in an alternative embodiment, the CPM 16 and the phone switch 14 may be configured to operate serially. However, call processing may be particularly useful when it occurs in parallel, so that once a call comes into the switch 14, there are further resources available for new calls. Similarly, multiple instances of the CPM 16 can be invoked to handle concurrent calls.

The switch 14, upon receiving the directive to hand off the call to the CPM 16, loads an object with various call related data, including but not limited to: caller 10 identification, call channel, call status, and call automatic number identification. This data is provided to the CPM 16 through a bidirectional data path, referred to herein as the Application Gateway Interface (AGI), which is between the phone switch 14 and the CPM 16. Through the AGI specification, the CPM 16 is able to influence and invoke processes on the phone switch 14 as well as alter how the call is being handled. Some examples of the AGI would allow any program (such as the CPM 16) to hangup a call, play a sound on the call, bridge 22 the call to another call, or ask for DTMF input.

The CPM 16 may be composed of various checks and database queries that aid in the processing and routing of the phone call. For example, the call is handed from the phone switch 14 to the CPM 16. The CPM 16 may either be compiled object code or uncompiled source or script code. In the case where it is source or script code, an interpreter is invoked which causes the code to be compiled and executed in real time. Once the object code has started to execute, the first basic instruction is to establish a connection to the database 18, as shown in FIG. 3.

A relational database management system 18 may be utilized to manage the data of interrelated call and customer data. The database 18 may be indexed and optimized to increase the speed of queries and new record inserts. Simply, the database 18 is configured to generate a quick way to sort matches for particular fields. For example, an index may be created on a field in the account (e.g., the company name) so that whenever a search is conducted based on company name, it query will speed up.

A database connection may then be established and maintained via TCP/IP connection throughout the length of the CPM 16 execution. During the CPM 16 execution, additional queries can be made to the database 18, which can be made without a connection setup.

Once a connection is established, a test can be executed. If no connection can be established, an error message is generated (for example, in an audible fashion) to the Caller 10 and the error may be logged via email or other communication method such as phone, fax or the like. If a connection is established, provider may then determine whether the dialed phone number is a trackable phone number. If provider determines that the dialed phone number is not a trackable phone number or a provisioned phone number, provider may respond to the Caller 10 with an audible error message. Further, in one embodiment, provider may log an error to a database 18 indicating that a call setup could not be completed.

Figure 4:
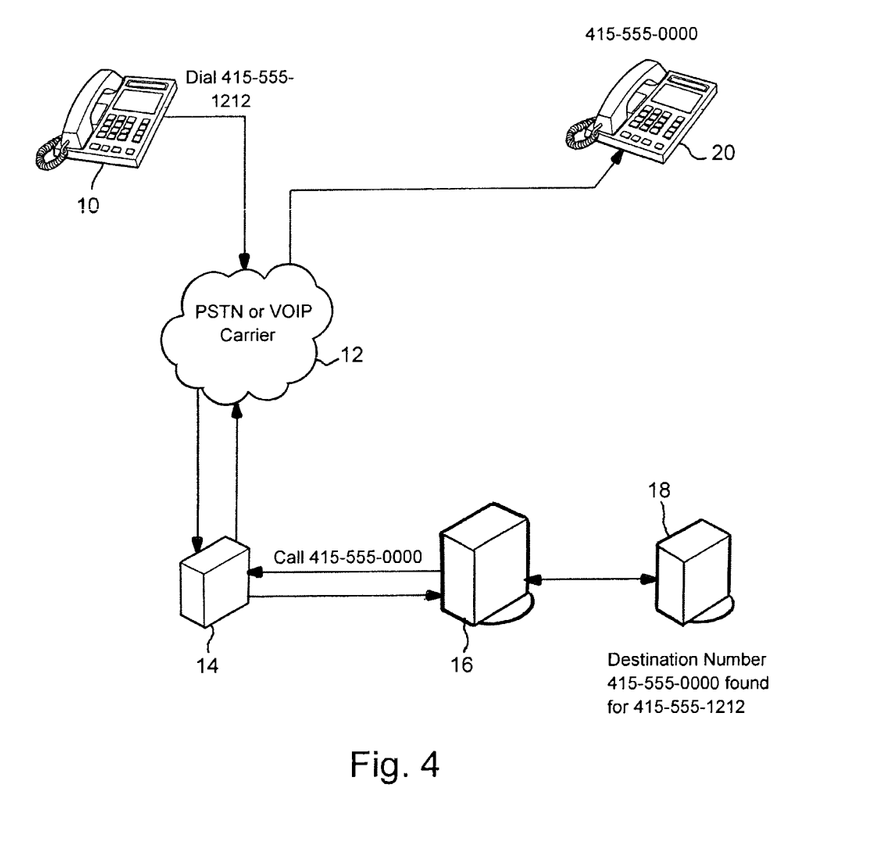
FIG. 4 illustrates yet another embodiment of call processing.

If provider determines that the phone number dialed by the Caller 10 is a trackable phone number, the provider may then locate the Destination Number 20 and associated Customer, as shown in FIG. 4. Although in this embodiment each trackable phone number is associated with one destination (i.e., Destination Number 20), it is to be appreciated that multiple trackable phone numbers may be associated with the same destination (i.e., Destination Number 20). In one embodiment, at this point, it may be useful to determine that the Customer's balance meets or exceeds the minimum call charges associated with the call placed through the trackable phone number. If the balance is zero, or if the balance is positive but less than the minimum call charges, the CPM 16 stops processing, generates a SIT back to the Caller 10, and hangs up the call. However, checking the balance of the Customer may be conducted at any stage of the described system and process. Alternatively, the provider may continue processing the call and then bill the Customer at a later time.

Figure 5:
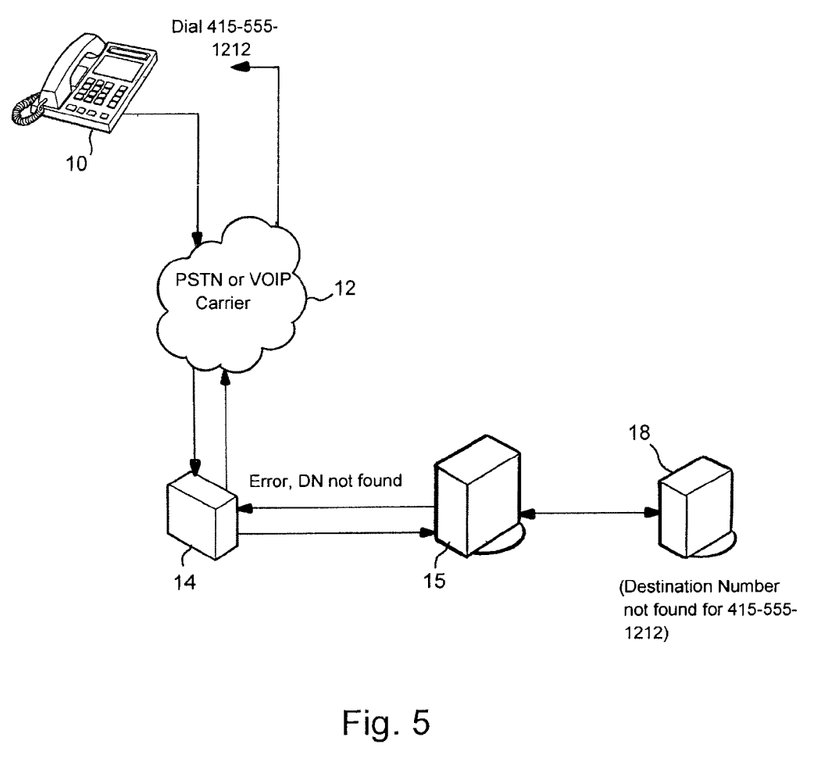
FIG. 5 yet another embodiment of call processing.

If no Destination Number 20 for the trackable phone number is found, the CPM 16 generates an error message to the Caller 10 and the incident is logged in the database 18, such as in shown in FIG. 5. For example, Customer may have provisioned a trackable phone number but may not have provided a final destination mapping for that the trackable phone number. The error message may be provided in a number of different ways, including but not limited to a generic telecom fast busy signal, or even a an audible message.

Once the dialed phone number has been determined to be a trackable phone number, and associated Customer and the Destination Number 20 are determined, the trackable phone number is associated with the Destination Number 20. The Destination Number 20 can be accessed over the PSTN, via VOIP, or directly via IP. Through use of a trackable phone number, the Caller 10 may only be aware of the trackable phone number that he has called. In other words, the Caller 10 is not likely to know the Destination Number 20, as he is likely only familiar with the trackable phone number placed on advertisements and marketing materials.

Figure 6:
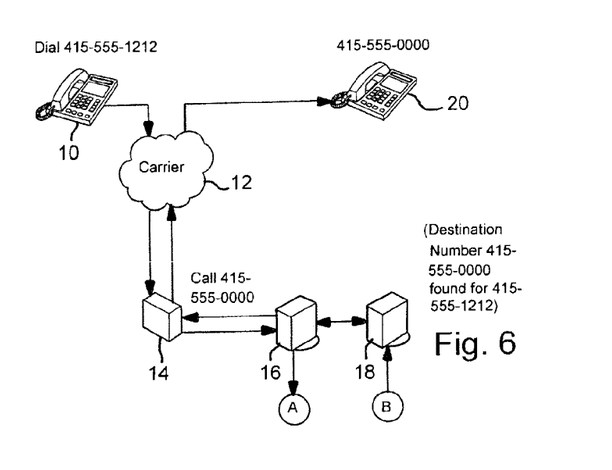
FIG. 6 illustrates one embodiment of call processing and call detail record.
Figure 6A:
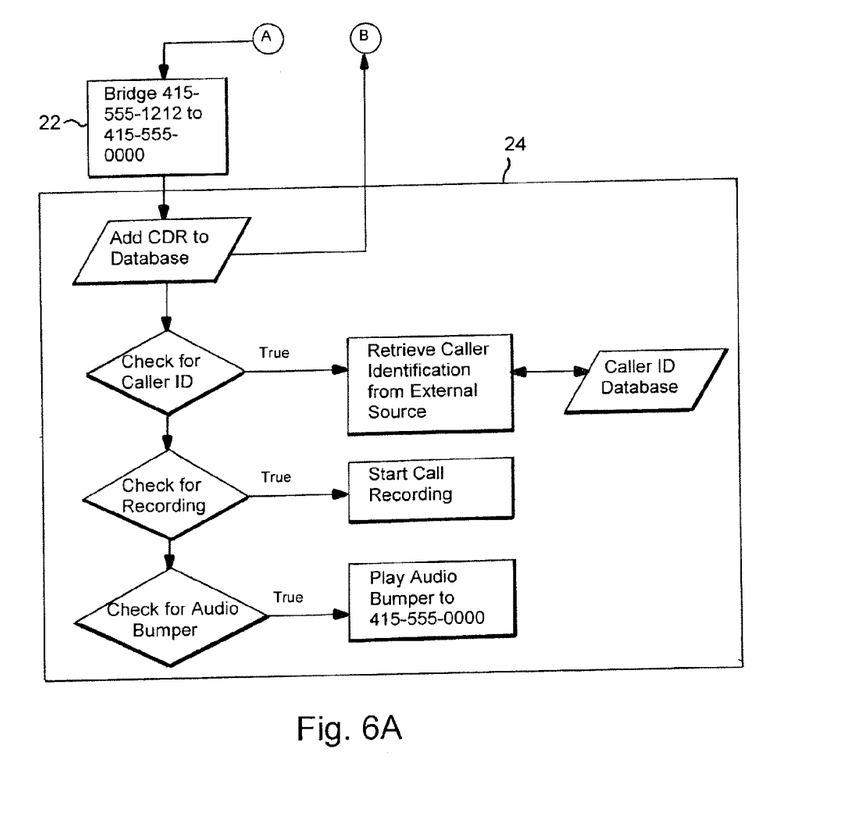

If a Destination Number 20 is associated with the trackable phone number, an outbound call may be generated to the Destination Number 20. In one embodiment, the provider system creates a second call, also called an outbound call, to the Destination Number 20 and then bridges 22 the inbound call the Caller 10 to the Customer specified Destination Number 20, as shown in FIG. 6. This provider-originated outbound call is also sometimes herein referred to as the "second call leg". To begin the second call leg, the provider CPM 16 communicates to the phone switch 14 through its AGI interface to inform the switch 14 to start the outbound call. The CPM 16 provides the Destination Number information as well as the current call context, i.e., a grouping of data and computer programming functions related to that phone call. For instance, the switch 14 collects Caller-id, called number, and has internal variables like the channel associated with the call, etc. When the CPM 16 is executed, a package of data and functions are sent to the CPM 16. Functions may include any type of command associated with the second call leg. Some examples of functions may include a command to hang up the call or to add the call to an existing telephone conference. The switch 14 will attempt to connect to the provided Destination Number 20 via the format specified in the CPM 16. Some examples of the format might be traditional PSTN signaling (PRI, E&M) or SIP if the carrier 12 connection is a VOIP connection. Additionally, provider may use multiple telecommunications carriers 12 to complete this second call leg. The provider may configure the carriers 12 in a "round-robin" fashion where the primary carrier 12 for the call is rotated. The provider may also configure a backup call route in case the primary carrier 12 is unable to complete the call. It is to be appreciated that the call made by the Caller 10 using the trackable phone number can be connected to the Destination Number 20 through any type of call-forwarding, or the like, technology. Such conventional means are known to those skilled in the art.

If a call cannot be connected to the Destination Number 20 a special information tone is generated to the Caller 10 and the error is logged into the call detail record (CDR) of the database 18, as shown in FIG. 5. If the outbound call from the provider to the Destination Number 20 is answered at the Destination Number 20, the switch 14 bridges 22 the Caller 10 (or first leg together) with the Customer (or second leg) to form an end-to-end phone call, as shown in FIG. 6. In this case, the Caller 10 is communicating via voice to the Destination Number 20 through the trackable phone number.

Once the call is answered, certain triggers 24 may be executed by the CPM 16. As shown in FIG. 6, one trigger may be the establishment of the initial CDR. The provider may include into the database 18 any desired CDR known, or which may be determined, about the call at that time including, but not limited to, calling party number, called party number, time of call start, time of signaling start, and phone switch 14 channel.

If the Customer has a Caller 10 identification command enabled through the Mapping and Management Module, the provider stores the Caller 10 phone number and may also query against a national directory database for additional Caller 10 detail. If enabled, the Caller 10 identification feature communicates with various informational database providers via an Extensible Markup Language interface (XML). This programming interface allows provider to query those informational database providers for detailed information about the specified Caller's 10 phone number. Such details may include Caller 10 name, address, and zip code of the Caller 10. The information from the informational database providers may be sourced from databases including the national 411/Directory Assistance database or the Line Information Database (LIDB) of the carrier 12 who owns the Caller's 10 phone number. In the event data is returned from the informational database provider to the provider, the provider loads information into the CDR.

In one embodiment, a Customer may request call recording, in which case, provider creates an audio file and starts mixing and injecting data from all sides of the audio conversation into this audio file on the provider storage server. A reference is included in the database 18 to the location of the audio file so that the Customer can retrieve the audio recording of the conversation. In the event call recording is not activated for the trackable phone number, the CPM 16 continues with another designated operation.

In another embodiment, the customer may specify an audio bumper file through the Mapping and Management Module. In this scenario, an audio file may be opened and streamed to the destination side of the conversation. This audio file may be used to alert the Customer (destination party) that the call is arriving from a trackable phone number. In the event an audio bumper is not specified for the trackable phone number, the CPM 16 proceeds to another designated operation.

Figure 7:
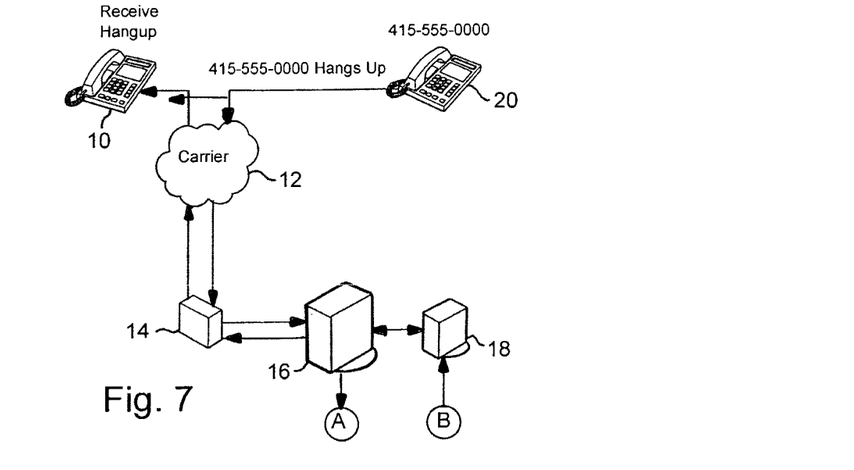
FIG. 7 illustrates one embodiment of post-call processing.
Figure 7A:
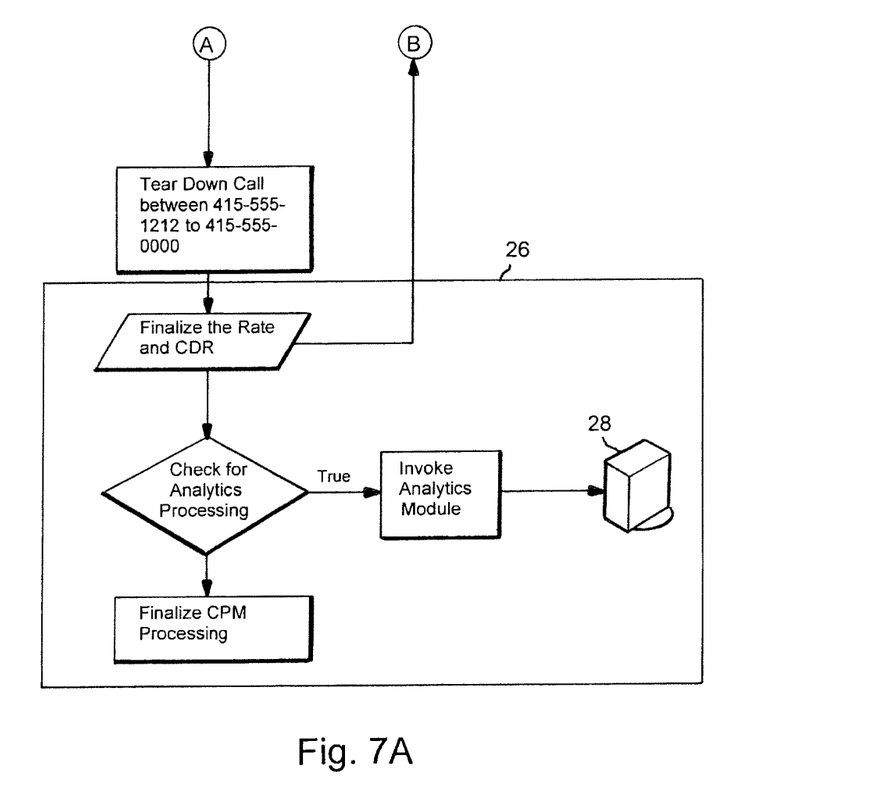

Once the above operations have been completed, the CPM 16 waits until the status of the call changes. Likely, one party will hang up the conversation and cause the signaling networks (SIP/SS7) to tear down the voice path from Caller 10 to Customer (i.e., destination to called party), as shown in FIG. 7. Upon the occurrence of this event, the CPM 16 initiates post-call processing 26.

As depicted in FIG. 7, in one embodiment, a step in post-call processing 26 includes rating the phone call. Since the CPM 16 has information relating to the phone call at this point, such as the total duration of the phone call, it can apply the rating module to the call. The rating module is a flexible engine that takes the details of the call and assigns a cost to the Customer for that call. The rating module is flexible in that it can include, but is not limited to, charging a fixed price per call regardless of duration, charging a per-minute price for the call, charging a per-second charge, assessing minimum billing increments (6 seconds, 30 seconds, 60 seconds) and various other functions to develop a comprehensive rate based on the characteristics of the call.

In one embodiment, the Analytics Module (AM) 28, may load one or more specified URLs every time a phone call is made to one of the Customer's trackable phone numbers if a URL is specified (or associated) with the trackable phone number (such as through the Mapping & Management Module). If a URL is specified, the CPM 16, upon termination of the call, invokes the AM 28. The AM 28 retrieves the specific URL associated with the trackable phone number and places it in a queue for retrieval by the Information Transmission Module (ITM) 32. Once the URL is placed in the queue for the ITM 32, the analytics processing will be continued by the ITM 32. The ITM 32 may be a program that is within the AM 28, or it may be a separate program that communicates with the AM 28.

Figure 8:
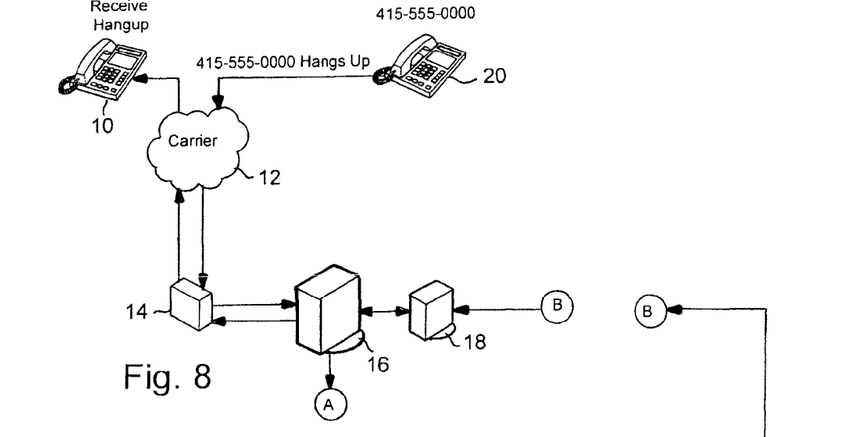
FIG. 8 illustrates one embodiment of post-call processing in connection with the analytics module.
Figure 8A:
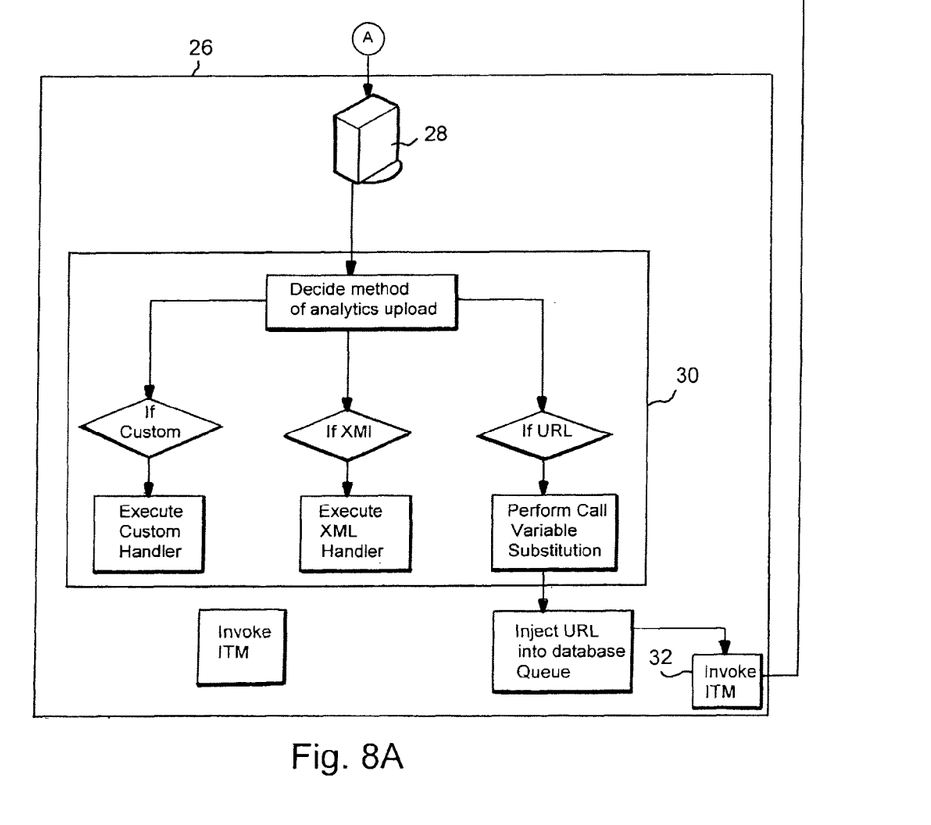

In an alternative embodiment, the AM 28 may invoke the ITM 32 directly. As shown in FIG. 8, the AM 28 specifies the information transmission handler 30 to the ITM 32. The information transmission handler (i.e., protocol) may be hypertext transfer protocol (HTTP), XML, or some other custom handler, though it is not necessarily limited to these three options. If the protocol is HTTP, the ITM 32 executes the URL provided by the AM 28 using a web browser object. If the protocol is XML, the ITM 32 uploads the call information to the URL specified by the AM 28 using a data structure provided by either the provider or the Customer. If the protocol is a custom handler, the ITM 32 invokes the processing code related to the custom handler.

Figure 9:
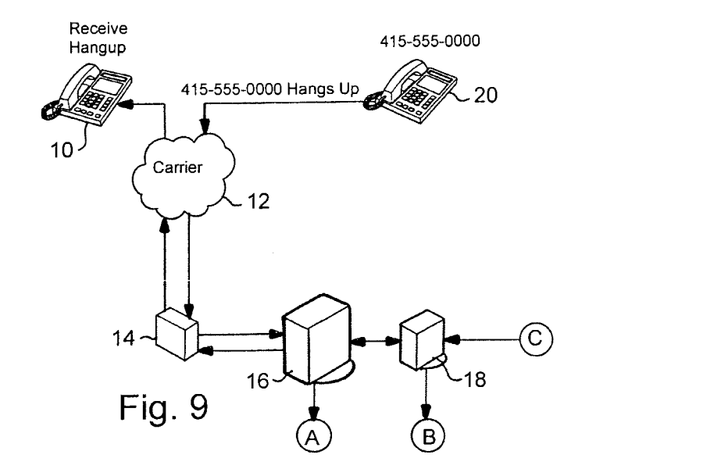
FIG. 9 illustrates another embodiment of post-call processing in connection with the analytics module.
Figure 9A:
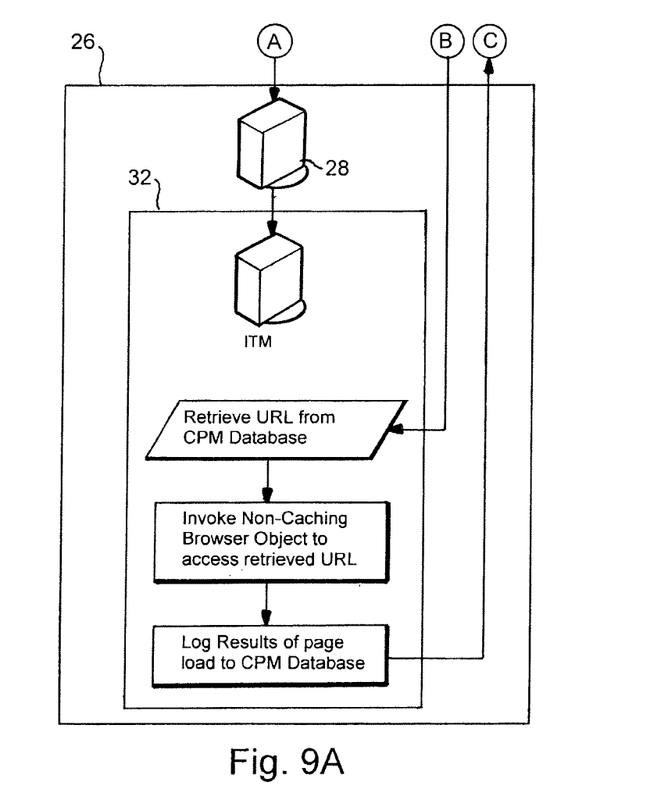

In general, as shown in FIG. 9, the AM 28 takes any Customer specified variables. including variables related to the phone call such as campaign information, promotion information, source, keywords, and any other custom data), and submits (or visits) a specified URL. The specified URL may be the web address to a web page that includes an analytics package for integration into a reporting infrastructure. The methods and construction of the uploading may vary by vendors of various analytics packages, but in general, they are the result of executing on-page javascript from a specified web page.

In one embodiment, the Customer (or its agent) designates a URL that the AM 28 will cause to be executed (i.e., visited) upon termination of the call. During this execution, data, including the Customer-specified variables such as call detail record and other information associated with the trackable phone number by the CPM 16, is submitted to a designated URL. In one useful embodiment, detailed information, may include information on the campaign, promotion, keyword or keywords, medium and content. In another useful embodiment, the URL may include an analytics vendor that is designated by the Customer. Through use of any analytics software, the Customer can view website hits or web visits that have been generated and, through the configurable URL, will be able to ascertain the number of phone calls their campaigns and/or keywords are generating.

In one embodiment, the AM 28 constructs the URL dynamically, with all the parameters and variables that have been designated by the Customer, and then places that URL in the queue. In an alternative embodiment, the Customer has specified the full URL and does not need the AM 28 to construct the parameters. In either scenario, however, the end-URL is placed into a processing queue for the ITM 32. The ITM 32 may be any internet-enabled device. The ITM 32 is capable of running one or more operating systems with browsers, such as Internet Explorer, Firefox, and Opera. The ITM 32 may also run a more basic operating system which may not, for example, include a graphical user interface but instead merely include text-based command lines. In the event an application programming interface (API) is specified, as opposed to an on-page tagging interface, the AM 28 constructs a URL based on the interface parameters specified by an analytics program or an analytics provider in their API. Once the URL is constructed with the proper parameters, it is placed in the URL queue for the ITM 32 to process.

In one embodiment, the ITM 32 may run on one or more set of servers, which may be servers that are the same or which are different from servers which house the CPM 16 and the AM 28. As described above, the ITM 32 may include a fully functional and customized web browser. The ITM 32 is invoked periodically, for example every 1 minute, 5 minutes, 10 minutes, or any other desired time period, or it can be a continuously operating program. The ITM 32 connects to the provider database 18 and checks the URL queue for any designated URLs that need to be processed. The ITM 32 then downloads the list of URLs and visits them through its browser object. This browser object is compatible with most commercially available graphical web browsers for Windows and Linux. In one embodiment, the browser object does not cache or retain cookie information to ensure that multiple hits to a specific URL are classified as distinct visits versus additional page views. Once the browser object visits the URL and runs the code that is specified on the page, it then updates the database 18 to reflect that the URL item(s) have been processed. At this point, the browser object may move the processed URL item(s) to a URL log. At this point, the customer phone call data will have been submitted to a website. In the event that the URL visit was made to an analytics provider, the Customer will be able to review the new phone call data in its analytics provider interface.

Dynamic URL insertion is the process whereby the Customer defines a set of rules and patterns that are then executed by the AM 28 in order to construct a dynamically generated URL, which is then delivered to the Information Transmission Module (ITM) 32 for further processing. Unlike a static URL, which does not change and is the same URL processed by the ITM 32 every time the tracking number is dialed, dynamic URLs contain a string of user-defined variables. These variables are populated with data arising from the phone call transaction. The constructed dynamically generated URL stores information, such as the call, campaign, keyword, or externally queried details placed from the connected call within the URL. The call details can include but are not limited to incoming Caller 10 phone number, destination phone number, call duration, incoming Caller 10 billing address, and call connection status.

In one embodiment, the Customer may establish rules and patterns in order to create their custom URLs. Rules may consists of a set of predefined conditions which, if met, generate the dynamic URL. Examples of rules can include criteria that are met with respect to call duration time, incoming calls from specified geographic areas or area codes, or incoming Caller 10 billing address, the time or the date the call is placed, and past call history of the incoming Caller 10 phone number, etc. Rule data can be retrieved from the call transaction details or queried from an external source (e.g., the Customer, Customer-designated source, etc.) in order to verify that the conditions of the rule have been met.

Patterns describe the variables that the Customer has elected to appear in the URL based upon the rules. The Customer may define variables, and the variables may be populated with a wide variety of data. The data can include information such as information about the past calling history of the incoming Caller 10, the Customer-defined campaign or keywords associated with the tracking number, the call detail information including incoming Caller 10 phone number, incoming Caller 10 mailing address, Destination Number, call duration, the base URL which the dynamic sting of variables is attached to, or other desired information.

Analytics packages that may be configured for use with the trackable phone number include those that may be offered by provider or by a third party. One example of an analytics provider is Google Analytics. Generally, web analytics packages include third-party interfaces, such as website, that allow a Customer to view statistics, trending, and analysis regarding traffic sustained at the Customer's website. In one embodiment, the provider integrates into these analytics packages by uploading phone call statistics in a variety of methods based on the integration path specific to the third-party vendor. In this way, the Customer can see both third party web site visits (which may be tracked by the third party web analytics provider) to his website and any phone calls generated by a Caller 10 (which is tracked by provider) in the same reports to readily and easily enable comparison of the efficacy of various marketing campaigns. In one embodiment, the trackable phone number system and method described herein works universally with any analytics provider that implements on-page tagging.

In one embodiment of the on-page tagging analytics implementation, the Customer, or the Customer's agent, specifies a URL on the Customer's website for the provider's server to visit. The URL contains the Customer's on-page tagging credentials (e.g., analytics code) that are typically part of the account that the Customer has set up with his analytics provider. When the provider's server hits (or visits) the page, the "hit" is tracked by the analytics provider as a phone call with the specified parameters.

In one embodiment, through use of on-page tagging, the provider does not store or cache cookies. As a result, multiple visits by the provider are identified as "unique hits". This may be useful because the phone call data is filtered up to the top level of the customer's analytics statistics so it can be compared directly against web visits. In contrast, if cookies are used by the provider, the URL hits by the provider server would be classified as multiple "page views" which may cause the data to be filtered lower in the hierarchy and not allow the Customer (e.g., Customer) the ability to easily and accurately compare the Customer's web traffic to the Customer's phone traffic.

In an alternative embodiment, the API may interface directly with an analytics provider. In this case, the analytics provider specifies a URL to the provider, with the URL including various configuration objects, or variables, passed as parameters in the URL string. Once provider hits the specified URL, the analytics provider disassembles the information in the URL and uses the information to log the URL hit to the Customer's reports and statistics.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A network-enabled system to ascertain information on the behavior of a caller, the system comprising:
    at least one call processing server coupled to a communication network and running software that is configured to route an incoming phone call to a destination number associated with a trackable phone number that has been served to a web-page,
    wherein, in response to the incoming phone call made to the trackable phone number, the at least one call processing server, connects the incoming phone call to the destination number and loads call information into a database that is accessible at the destination number,
    wherein the call information indicates information indicating behavior of a corresponding caller performed prior to initiation of the call by the caller at a calling number.

2. The system of claim 1, wherein the call information includes at least one of the calling number, destination number called, time of call start and an indication of the web-page to which the trackable phone number was served.

3. The system of claim 1, wherein the call processing server runs software that is configured to record the incoming phone call made to the trackable phone number as a data file, and wherein the system further comprises:
    a memory in which the recorded data file is stored; and
    a database stores a reference to a storage location of the data file in the memory.

4. The system of claim 1, wherein the at least one call processing server queries at least one national directory database to obtain data regarding the phone number originating the incoming phone call and provides that information to be accessible at the destination number.

5. The system of claim 1, further comprising an interface that enables a query of at least one informational database for detailed information about the calling number.

6. The system of claim 5, wherein the detailed information includes caller name, caller address, and caller zip code.

7. The system of claim 6, wherein the at least one informational database is a national 411/Directory Assistance database or a Line Information Database of a telecommunications carrier.

8. The system of claim 5, wherein, once the call is completed, the at least one call processing server creates an audio file of a recording of contents of the phone call and mixes and injects data from all sides of the audio conversation into the audio file and stores the audio file in memory.

9. The system of claim 1, wherein the destination number is accessed over the at least one communication network.

10. The system of claim 9, wherein the at least one communication network is at least one of a public switched telephone network (PSTN) and a voice over internet protocol (VOIP) network.

11. The system of claim 1, wherein the at least one call processing server generates an outbound call to the destination number and bridges the incoming phone call to the outbound call to connect the incoming phone call to the destination number.

12. A method of ascertaining information on the behavior of a caller, the method comprising:
routing an incoming phone call to a destination number associated with a trackable phone number that has been served to a web-page, wherein the routing is performed using at least one call processing server coupled to a communication network; and
in response to the incoming phone call made to the trackable phone number, connecting the incoming phone call to the destination number using the at least one call processing server, and loading call information into a database that is accessible at the destination number using the at least one call processing server,
wherein the call information indicates information indicating behavior of a corresponding caller performed prior to initiation of the call by the caller at a calling number.

13. The method of claim 12, wherein the call information includes at least one of the calling number, destination number called, time of call start and an indication of the web-page to which the trackable phone number was served.

14. The method of claim 12, wherein the call processing server runs software that is configured to record the incoming phone call made to the trackable phone number as a data file, and wherein the system further comprises:
a memory in which the recorded data file is stored; and
a database stores a reference to a storage location of the data file in the memory.

15. The method of claim 12, wherein the at least one call processing server queries at least one national directory database to obtain data regarding the phone number originating the incoming phone call and provides that information to be accessible at the destination number.

16. The method of claim 12, further comprising an interface that enables a query of at least one informational database for detailed information about the calling number.

17. The method of claim 12, wherein the detailed information includes caller name, caller address, and caller zip code.

18. The method of claim 12, wherein the at least one informational database is a national 411/Directory Assistance database or a Line Information Database of a telecommunications carrier.

19. The method of claim 12, wherein, once the call is completed, the at least one call processing server creates an audio file of a recording of contents of the phone call and mixes and injects data from all sides of the audio conversation into the audio file and stores the audio file in memory.

20. The method of claim 12, wherein the destination number is accessed over the at least one communication network.

21. The method of claim 12, wherein the at least one communication network is at least one of a public switched telephone network (PTSN) and a voice over internet protocol (VOIP) network.

22. The method of claim 12, wherein the at least one call processing server generates an outbound call to the destination number and bridges the incoming phone call to the outbound call to connect the incoming phone call to the destination number.

* * * * *